Oct. 21, 1924.

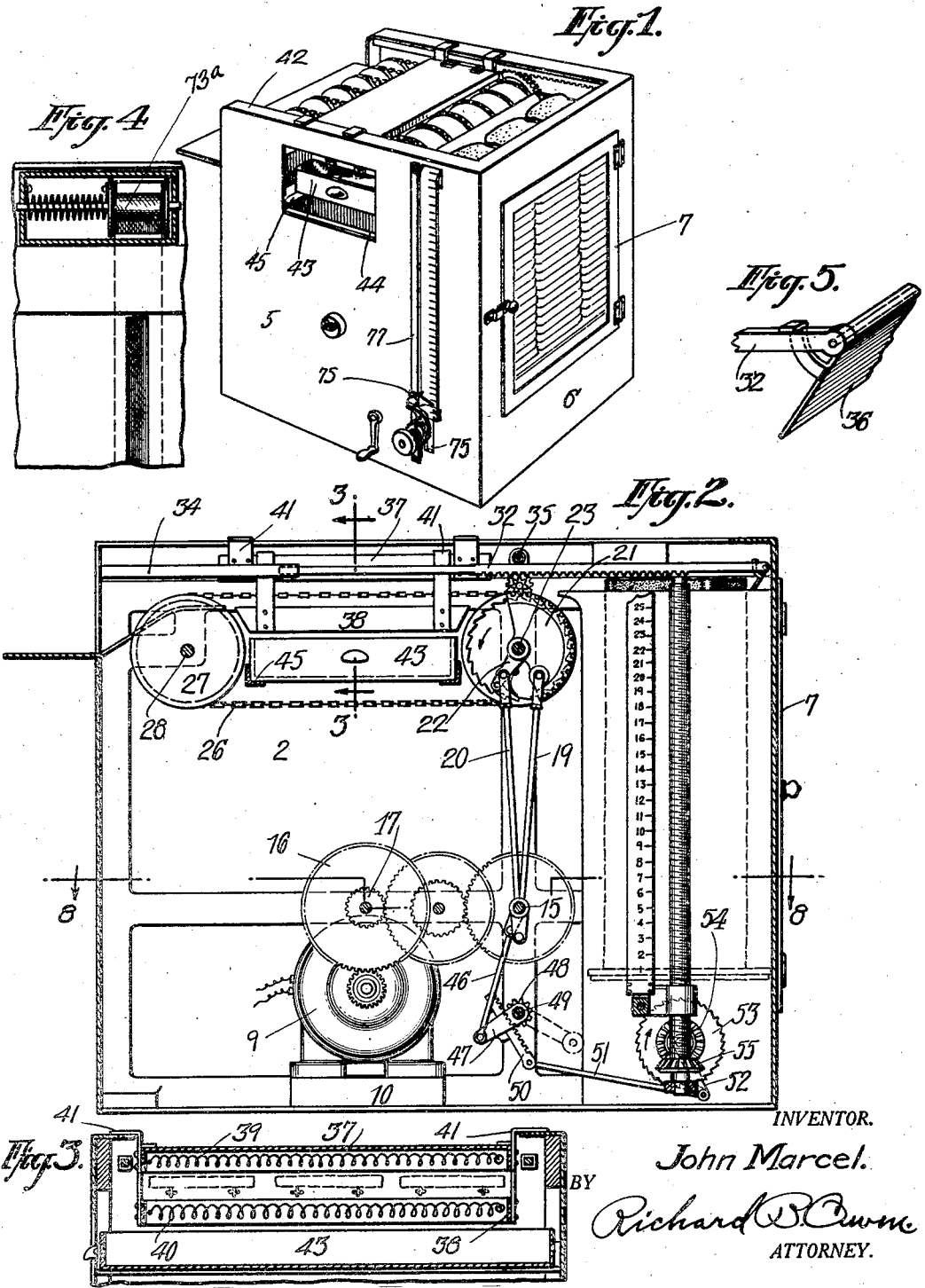

J. MARCEL 1,512,122

ELECTRIC TOASTING MACHINE

Filed April 26, 1923    4 Sheets-Sheet 2

INVENTOR.
John Marcel.
BY Richard Brown
HIS ATTORNEY.

Oct. 21, 1924.  
J. MARCEL  
ELECTRIC TOASTING MACHINE  
Filed April 26, 1923   4 Sheets-Sheet 3
1,512,122
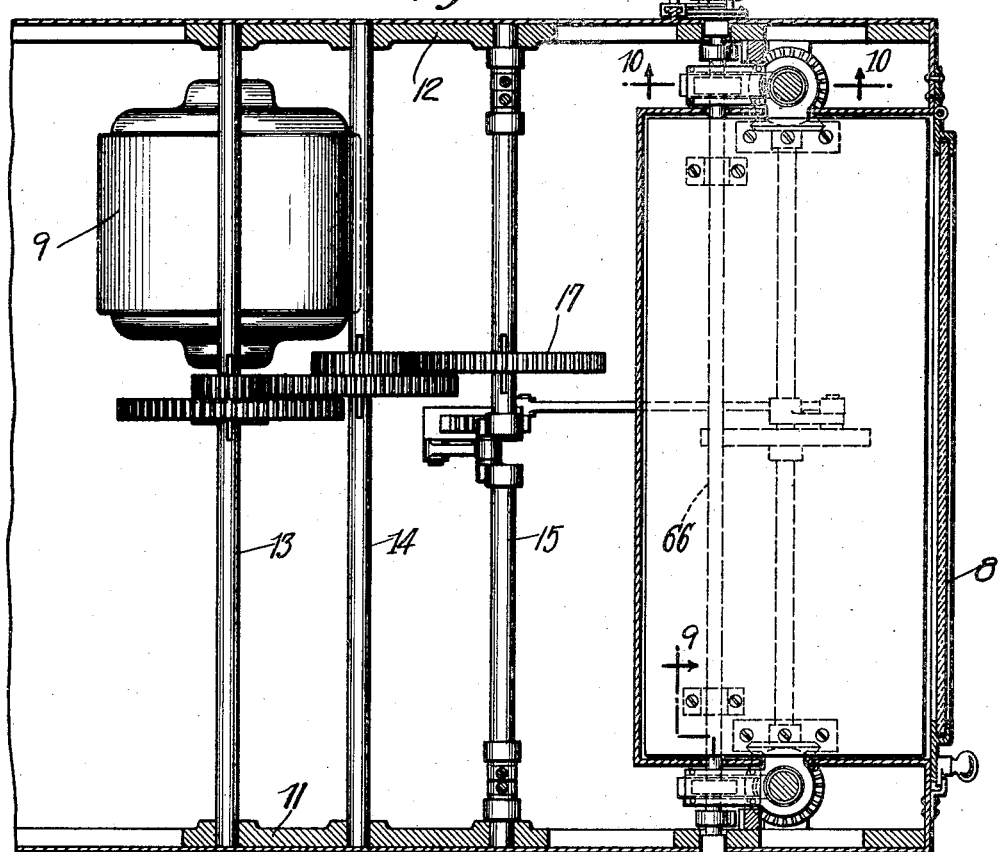
Fig. 8.
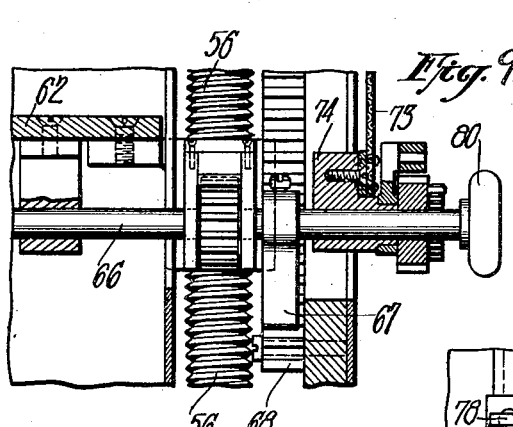
Fig. 9.
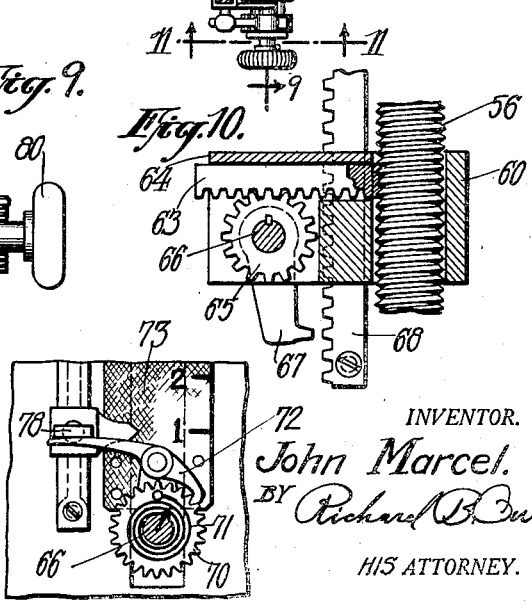
Fig. 10.
Fig. 11.
INVENTOR.  
John Marcel.  
BY Richard B. Owen  
HIS ATTORNEY.

Oct. 21, 1924.
J. MARCEL
1,512,122
ELECTRIC TOASTING MACHINE
Filed April 26, 1923    4 Sheets-Sheet 4
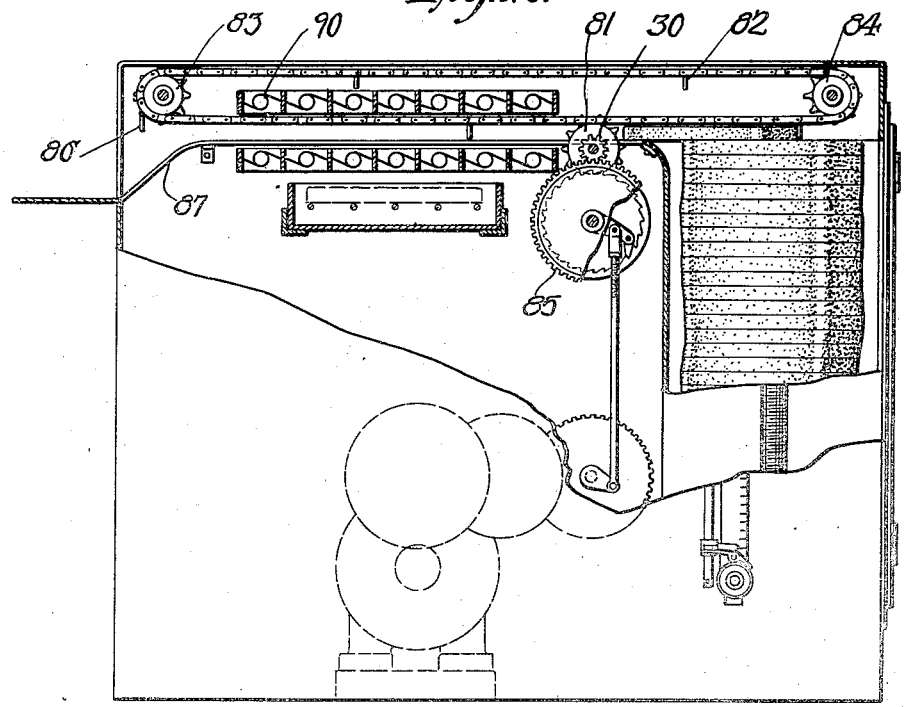
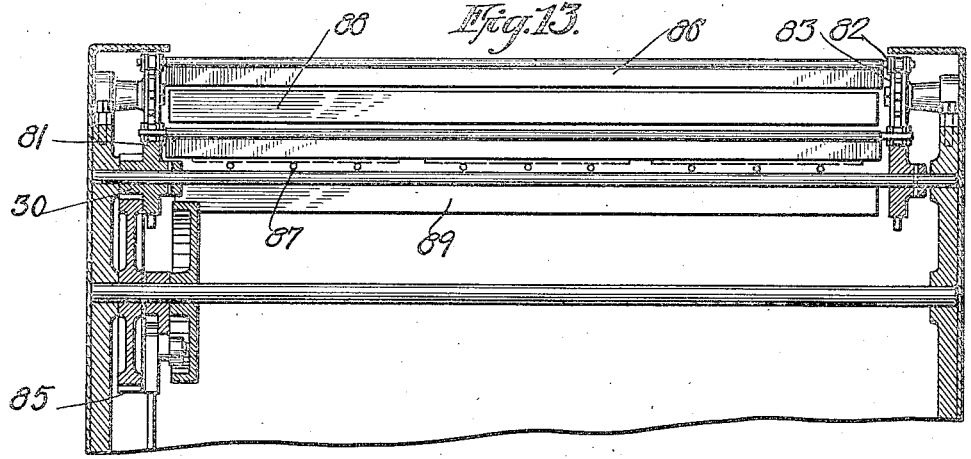
INVENTOR.
John Marcel.
BY
ATTORNEY.

Patented Oct. 21, 1924.

1,512,122

UNITED STATES PATENT OFFICE.

JOHN MARCEL, OF NEW YORK, N. Y.

ELECTRIC TOASTING MACHINE.

Application filed April 26, 1923. Serial No. 634,869.

*To all whom it may concern:*

Be it known that I, JOHN MARCEL, a subject of the King of Greece, residing at New York, in the county of New York and State of New York, have invented certain new and useful Improvements in Electric Toasting Machines, of which the following is a specification.

This invention relates to electric bread toasting machines and more particularly to a novel and improved automatically operable device whereby a plurality of sliced pieces of bread may be elevated and conveyed over an electric grid without attention on the part of the operator.

One of the objects of my invention is to provide an electrically driven, automatic bread toasting machine or device wherein a plurality of stacked pieces of sliced bread may be intermittently raised and the top layers of bread fed and conveyed to an electric grid so that the top and bottom of the bread may be uniformly toasted during their passage on the conveying mechanism.

Another object of my invention is to provide an electric toaster of the character above set forth including a novel and improved, combined elevating and conveying mechanism cooperating so as to intermittently feed a plurality of pieces of sliced bread to an electric grid and discharge the toasted bread at the end of their travel on the conveying mechanism.

A further object of my invention is to provide an electric toaster wherein the elevating mechanism and conveying mechanism is operated by a common source of power, such as a motor, including provision whereby a predetermined number of pieces of sliced bread may be toasted automatically and without undue attention on the part of the operator.

I accomplish the above objects and others which will be more fully understood when taken in connection with the accompanying drawings, wherein I have shown a preferred embodiment of my invention and wherein, Figure 1 is a perspective view showing the casing and the entire device as a unit.

Figure 2 is a side view of the conveying elevating mechanism within the casing.

Figure 3 is a sectional view, taken on the line 3—3 of Figure 2.

Figure 4 is a detailed sectional view of the graduated measuring tape.

Figure 5 is an enlarged fragmentary view of the feed bar and its drag plate or leaf.

Figure 8 is a sectional view taken substantially on the line 8—8 of Figure 2.

Figure 9 is a section taken on the line 9—9 of Figure 8.

Figure 10 is a view taken substantially on the line 10—10 of Figure 8.

Figure 11 is a further view taken on the line 11—11 of Figure 8.

Figure 12 is a modified form of drag construction for the conveyors.

Figure 13 is a front view thereof.

Figure 6:
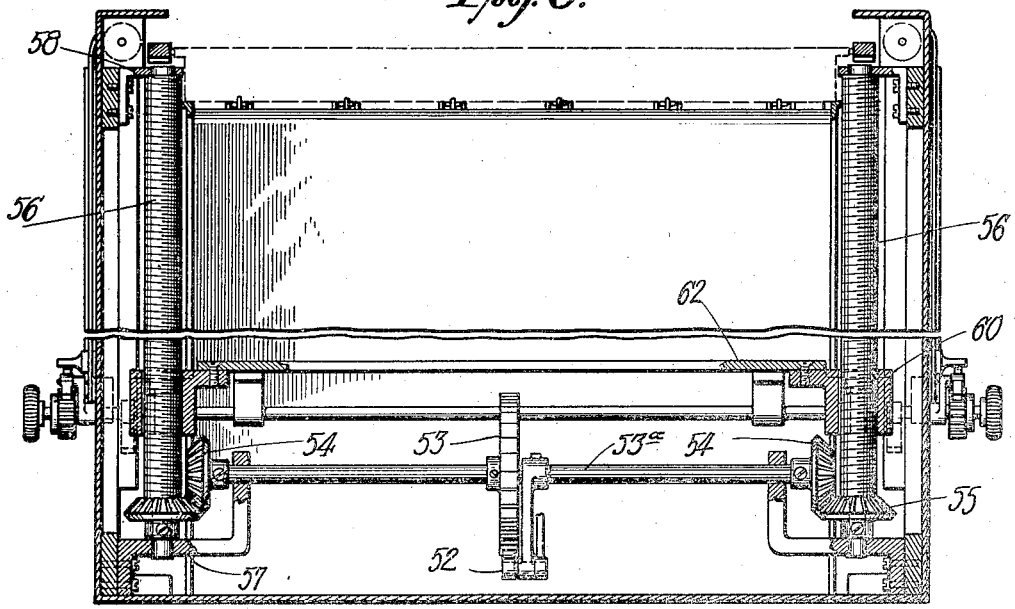
Figure 6 is a front vertical section of the elevating mechanism.

Referring now to the drawings wherein like reference characters designate corresponding parts throughout the several views, 5 designates the casing or housing of the mechanism and 6 the front wall thereof which is provided with a hingedly connected door 7 having a transparent panel or window 8 permitting observation of the uniformly sliced pieces of bread as shown clearly by Figure 1 of the drawing. The internal mechanism, being preferably electrically driven, includes a motor 9 which is mounted on a base 10 preferably positioned centrally of the casing to counterbalance the elevating and conveying mechanism subsequently to be described. Attached to the sides of the casing, bearing plates 11, 12, are provided to support the horizontally extending shafts 13, 14, in addition to a crank shaft 15, all of said shafts being in the said plane. The motor is connected with a set of reduced gears and pinions 16, 17, for operating the crank shaft 15 to which the conveyor operating mechanism and the elevating operating mechanism are connected for unitary and cooperative movement in the manner now to be described.

Connected to the crank arm 18 at the opposite ends of the crank shaft 15, I have provided a pair of connecting rods designated 19, 20, the connecting rod 19 being attached to a segmental gear 21, loosely mounted on a shaft 23 supported by the bearing plates 11, 12, heretofore referred to. The connecting rod 20 is connected at its upper end to a depending arm 22, said arm carrying a dog 23ª which engages the teeth of the ratchet wheel 24 on the shaft 23 so as to intermittently rotate the shaft and a series of pulleys 25 mounted thereon, the said pulleys having trained thereon the conveying chain 26 on which the sliced pieces of bread are carried across the electric grid, further to be referred to.

The conveyors or chains 26, of course, pass over an idler 27 mounted on a horizontal shaft 28 to the rear of the machine and in the same plane as the shaft 23. Cooperating with the segmental gear 21, I have provided a pinion 30 rotatable on a threaded stud 31, which pinion engages the teeth of a longitudinally extending rack bar 32 held in engagement with the pinion by a bearing roller 33 secured in the sides and above the rack bar. One end of the rack bar 32 extends into the guide 34 disposed near the top of the casing and at the rear end thereof and the opposite end of the bar 32 is provided with a hingedly connected leaf or drag plate 36 which is adapted to slide or brush a slice of bread inwardly toward the conveying chain 26. Upon the operation therefore of the crank shaft, it will be readily recognized that an intermittent motion is imparted to the conveying chain and a longitudinal reciprocating movement imparted to the rack bar 32 which travels back and forth and is timed to engage the successive slices of bread as they are fed upwardly and disposed in the path of the glass plate 36.

The conveyor chains travel between a pair of grids 37, 38, in which the conductors or heating elements 39, 40 are positioned, the upper grid 37 being supported by the L-shaped brackets 41 overlying the inwardly bent flanges 42 of the casing, and the lower grid 38 is suspended by similar brackets supported by the sides of the upper grid above referred to. It will be seen that the grids may be easily separated and removed as desired. Beneath the grid 38, I have also provided a sliding drawer which may be moved inwardly and outwardly through the opening 44 on the guide rails 45.

Connected to a crank bar substantially intermediate the ends of the shaft 15, I have provided a connecting rod 46 and to the lower end of said connecting rod, an oscillating arm 47 is attached, the last mentioned arm being adapted to rotate a pinion 48 on the shaft 49. The pinion meshes with a short rack bar 50, upon each oscillation to actuate a lever 51, one end of the lever being connected to the rack bar 50 and the opposite end provided with a dog 52 cooperating with a ratchet wheel 53 as clearly shown by Figure 2 of the drawing. The ratchet 53 carries a bevel gear 54 which meshes with a bevel gear 55 on the lower end of a feed screw 56, it being observed that each feed screw on opposite sides of the casing, journals in a bracket 57 secured to the casing adjacent the bottom and a second bracket 58 secured to the casing near the top thereof. Each of the feed screws 56 carries a loose collar 60 which is threaded internally for engagement with the threads of the feed screw 56 so that when the said screws are rotated, the said collars will be elevated and will consequently raise the support 62 attached to the respective collars. In order to disengage the said collars, I have provided a horizontal rack bar 63 on the interior of the block 64 connected to the collar 60, the rack bar 63 meshing with a pinion 65 on a horizontal shaft 66. A toothed dog 67 cooperating with the teeth of a vertical rack bar 68 maintains the collar disengaged from the feed screws 56 so that the same may operate without raising the carrier 62. In order to effect this disengagement, I have provided a star wheel 70 on the shaft 66, held by a spring 71, said wheel being normally engaged by a pivoted dog 72 mounted at the lower end of a measuring tape 73, attached to a bearing 74, which is raised and lowered with the shaft 66 in the slot 75 in the side of the casing. A guide 77 permanently secured to the side of the casing is provided with a movable trip corner 78, which may be moved to any position on said guide, corresponding with the graduated tape 73, the upper end of which is secured to a spring held roller 73ª, see Figure 4. The outer end of the dog 72 is of a length so as to extend outward and be engaged by the pointer 78 so that the star wheel 70 is released and as the same rotates, the pinion 65 will be actuated, moving the rack bar 63 inwardly, thus disengaging the threads of the collar 60 from the feed screws and at the same time, the dog 67 will be thrown into engagement with the teeth of the vertical rack bar 68 and retain the same. On the other hand, by rotating the knobs 80 of the shaft 66, the dog 67 may be disengaged from the rack bar 68 and the shaft and bearing 74 may be lowered to the initial or zero position.

Figure 7:
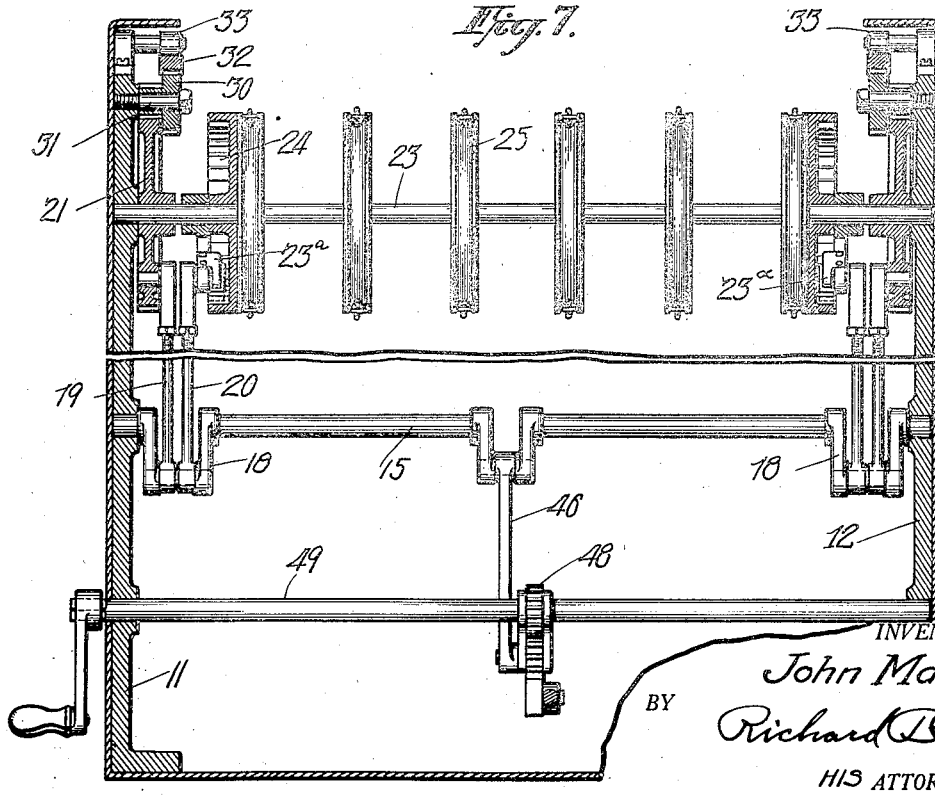
Figure 7 is a vertical section through the casing showing the conveying mechanism.

In the modified form of the construction of the drag, which brushes the top layer of sliced bread across the heating elements, the reciprocating rack bar 32 is dispensed with and the pinion 30ª is provided with a sprocket 81 cooperating with an endless conveyor chain 82 trained over the sprockets 83, 84. The pinion 30 is of course, in mesh with the gear 85 and is actuated intermittently in the same manner as heretofore described. It will be noted however, that connected to the endless chain 82, I have provided a plurality of equally spaced, transversely extending drag plates 86, which are so disposed that as the elevating mechanism raises the stack of sliced bread, the top layer will be engaged by one of the drag plates and carried along therewith, or in other words, brushed across to a series of wire supports, designated 87, which are positioned between the upper and lower grids 88, 89, in which the heating elements 90 are contained for the obvious purpose. This construction permits of practically the same intermittent conveying operation across the heating elements as above described and necessarily dispenses with the use of a plurality of conveyor chains 26 and idlers therefor as described in connection with the showing of Figures 2 and 7, for instance.

While I have illustrated and described my invention with some degree of particularity, I realize that in practice various alterations therein may be made. I therefore reserve the right and privilege of changing the construction of the details of construction or otherwise altering the arrangement of the correlated parts without departing from the spirit of the invention or the scope of the appended claims.

Having thus described my invention what I claim as new and desire to secure by United States Letters Patent is:—

1. An electric bread toasting machine comprising a casing, a motor and heating coils within the casing, reduction gearing driven by the motor, an intermittently driven conveyor, a bread elevating mechanism cooperating with the conveyor, and means for automatically transferring the bread from the elevating to the conveyor mechanism.

2. An electric bread toasting machine comprising a casing, a motor and heating coils within the casing, reduction gearing driven by the motor, an intermittently driven conveyor positioned in the top of the casing, an intermittently operated elevating mechanism cooperating with the conveyor and means connected with the conveyor mechanism for transferring the bread from the elevator to the said conveying mechanism.

3. An electric bread toasting machine comprising a casing, a motor and heating coils within the casing, gearing driven by the motor, a conveyor positioned in the upper portion of the casing, an elevator positioned in the front of the casing, reciprocating means connecting the conveyor and elevating mechanism with the gearing for intermittently actuating the same and means connected with the conveyor driven mechanism for transferring the bread from the elevator to the said conveying mechanism.

4. An electric bread toasting machine comprising a casing, a motor and heating coils within the casing, reduction gearing driven by the motor, a crank shaft, an endless conveyor, intermittently operated mechanism connecting the endless conveyor with the crank shaft, an elevator, and gearing connecting rods cooperating with the crank shaft for actuating the elevator simultaneously with the conveyor mechanism, and a reciprocating means for transferring the bread from the elevator to the conveying mechanism.

5. An electric bread toasting machine comprising a casing, a motor and heating coils within the casing, reduction gearing driven by the motor, a crank shaft, an endless conveyor positioned in the upper portion of the casing cooperating with the heating coils, means connecting the crank shaft with the endless conveyor, an elevator and feed screw means connected thereto, and intermittently operable means driven from the crank shaft for actuating the elevator in unison with the conveyor and means driven by the conveyor mechanism operable across the top of the elevator for transferring bread from the elevator to the said conveying mechanism.

6. An electric bread toasting machine comprising a casing, a motor and heating coils within the casing, a conveying mechanism and an elevating mechanism intermittently operable in unison from the motor, means for transferring bread from the elevator to the conveying mechanism and trip mechanism for rendering the elevating mechanism inoperative.

7. An electric bread toasting machine comprising a casing, a motor and heating coils within the casing, a conveying mechanism and an elevating mechanism intermittently operable in unison from the motor, means for transferring bread from the elevator to the conveying mechanism, said elevating mechanism including feed screw, gear operated means and reciprocable elements, and trip operated means for rendering the elevating mechanism inoperative at predetermined positions.

8. An electric bread toasting machine comprising a casing, a motor and heating coils within the casing, a conveying mechanism and an elevating mechanism intermittently operable in unison from the motor, means for transferring bread from the elevator to the conveying mechanism, said means comprising a reciprocating rack bar driven from the conveying mechanism across the top of the elevator, said elevator including feed screws and collars thereon, an adjustable trip mechanism on the outer side of the casing and means for releasing the collars from the screws when engaged by the trip mechanism.

In testimony whereof I affix my signature.

JOHN MARCEL. [L. s.]